(12) United States Patent
Sundaram et al.

(10) Patent No.: US 10,108,258 B2
(45) Date of Patent: Oct. 23, 2018

(54) MULTIPLE VIEWPOINT IMAGE CAPTURE OF A DISPLAY USER

(71) Applicant: Intel Corporation, Santa Clara, CA (US)

(72) Inventors: Arvind Sundaram, Bangalore (IN); Gangatharan Jothiswaran, Bangalore (IN)

(73) Assignee: INTEL CORPORATION, Santa Clara, CA (US)

( * ) Notice: Subject to any disclaimer, the term of this patent is extended or adjusted under 35 U.S.C. 154(b) by 292 days.

(21) Appl. No.: 14/019,983

(22) Filed: Sep. 6, 2013

(65) Prior Publication Data

US 2015/0070481 A1    Mar. 12, 2015

(51) Int. Cl.
*G06F 3/01* (2006.01)
*G06F 3/00* (2006.01)
(Continued)

(52) U.S. Cl.
CPC .............. *G06F 3/013* (2013.01); *G06F 3/005* (2013.01); *G06F 3/0304* (2013.01); *H04N 7/181* (2013.01)

(58) Field of Classification Search
CPC ........ G06F 3/013; G06F 3/005; G06F 3/0304; H04N 7/181; A61B 3/00; A61B 3/145; A61B 5/0077; A61B 34/20; A61B 90/361; A61B 90/37; A61B 2090/3612; A61B 2090/371; G06K 9/00597; G06K 9/00604;
(Continued)

(56) References Cited

U.S. PATENT DOCUMENTS 6,407,724 B2 * 6/2002 Waldern ............... G02B 5/1885
 345/7
6,526,159 B1 * 2/2003 Nickerson ............... G06F 3/013
 345/156

(Continued)

FOREIGN PATENT DOCUMENTS

CN     102569327 A  *  7/2012
KR     101064621 B1 *  9/2011

OTHER PUBLICATIONS

Fehn et al., Interactive 3-DTV—Concepts and Key Technologies, 2006, IEEE, pp. 524-538.*

(Continued)

*Primary Examiner* — Christopher S Kelley
*Assistant Examiner* — Kathleen M Walsh
(74) *Attorney, Agent, or Firm* — Womble Bond Dickinson (US) LLP (57) ABSTRACT

Embodiments of the invention describe apparatuses, systems and methods for capturing, selecting and analyzing image data of a user of a computing device display from multiple viewpoints. Embodiments of the invention capture or receive data comprising a plurality of images from an image capture system, wherein the plurality of images comprises images of a user of a computing system from multiple viewpoints. A gaze direction of the user with respect to the display is determined based, at least in part, on the plurality of images. Embodiments further determine a target area on the computing device display based, at least in part, on the determined gaze direction of the user, and execute an application operation in response to determining the target area of the user's gaze.

20 Claims, 7 Drawing Sheets

(51) Int. Cl.
  *G06F 3/03*  (2006.01)
  *A61B 3/00*  (2006.01)
  *H04N 7/18*  (2006.01)

(58) Field of Classification Search
  CPC ............ G06K 9/0061; G06K 9/00617; G06K 9/00221; G06K 9/00335; G06K 9/00362
  USPC .............................................. 348/78, 333.01
  See application file for complete search history.

(56) References Cited

U.S. PATENT DOCUMENTS

| | | | | |
|---|---|---|---|---|
| 7,714,923 B2* | 5/2010 | Cok | ........................ | H04N 7/144 345/175 |
| 7,750,982 B2* | 7/2010 | Nelson | ..................... | G02B 3/08 348/51 |
| 8,068,285 B1* | 11/2011 | Flynn | ....................... | G02B 13/00 359/619 |
| 8,395,656 B1* | 3/2013 | Malzbender | ......... | H04N 5/4403 348/14.08 |
| 8,446,514 B2* | 5/2013 | Border | ................ | H04N 5/2254 345/632 |
| 8,686,953 B2* | 4/2014 | MacDougall | ...... | G06K 9/00228 345/173 |
| 8,698,940 B2* | 4/2014 | Border | ................... | H04N 7/144 345/632 |
| 8,817,090 B2* | 8/2014 | Szczerba | ............... | G01S 13/723 348/113 |
| 8,823,740 B1* | 9/2014 | Amirparviz | ........ | G02B 27/0172 345/633 |
| 8,878,895 B2* | 11/2014 | Yoon | ........................ | H04N 7/14 348/14.01 |
| 8,885,882 B1* | 11/2014 | Yin | ........................... | G06F 3/00 382/103 |
| 8,913,004 B1* | 12/2014 | Bozarth | ............. | G06K 9/00604 345/156 |
| 8,957,847 B1* | 2/2015 | Karakotsios | ............ | G06F 3/013 345/156 |
| 9,041,766 B1* | 5/2015 | Gates | ........................ | H04N 7/15 348/14.08 |
| 9,057,931 B1* | 6/2015 | Baldwin | ..................... | G02F 1/00 |
| 2002/0126396 A1* | 9/2002 | Dolgoff | ............. | G02B 27/2278 359/743 |
| 2003/0152252 A1* | 8/2003 | Kondo | ............... | G06K 9/00597 382/117 |
| 2003/0156257 A1* | 8/2003 | Levola | ................ | A61B 3/113 351/210 |
| 2005/0128332 A1* | 6/2005 | Tsuboi | ................. | H04N 5/2253 348/333.12 |
| 2006/0054986 A1* | 3/2006 | Yu | ...................... | H01L 27/14621 257/432 |
| 2006/0158729 A1* | 7/2006 | Vissenberg | .......... | G02B 26/005 359/462 |
| 2008/0023624 A1* | 1/2008 | Moon | .................. | G02B 3/0056 250/216 |
| 2008/0043100 A1* | 2/2008 | Sobel | ................... | H04N 9/3194 348/139 |
| 2008/0165267 A1* | 7/2008 | Cok | ........................ | H04N 7/144 348/333.01 |
| 2009/0245696 A1* | 10/2009 | Yuan | ..................... | G06F 1/3203 382/312 |
| 2010/0295920 A1* | 11/2010 | McGowan | ............. | H04N 7/144 348/14.08 |
| 2011/0109880 A1* | 5/2011 | Nummela | ............... | A61B 3/113 351/210 |
| 2011/0141011 A1* | 6/2011 | Lashina | .................. | G06F 3/013 345/156 |
| 2012/0127128 A1* | 5/2012 | Large | ..................... | G06F 3/0425 345/175 |
| 2012/0147131 A1* | 6/2012 | Yoon | ........................ | H04N 7/14 348/14.16 |
| 2012/0287327 A1* | 11/2012 | Border | ................. | H04N 5/2254 348/333.09 |
| 2013/0050452 A1* | 2/2013 | Ramsey | ............. | H04N 13/0404 348/58 |
| 2013/0120548 A1* | 5/2013 | Li | ....................... | G06K 9/00604 348/78 |
| 2013/0242157 A1* | 9/2013 | Border | ................. | H04N 5/2254 348/333.01 |
| 2013/0342672 A1* | 12/2013 | Gray | ........................ | G06F 3/013 348/78 |
| 2014/0028548 A1* | 1/2014 | Bychkov | ................. | G06F 3/013 345/156 |
| 2014/0092472 A1* | 4/2014 | Woodgate | .......... | H04N 13/0402 359/464 |
| 2014/0118511 A1* | 5/2014 | Hyde | ................. | H04N 13/0402 348/54 |
| 2014/0200079 A1* | 7/2014 | Bathiche | ............ | H04N 13/0402 463/32 |
| 2014/0355841 A1* | 12/2014 | Santos-Villalobos | ....................... | G06K 9/0061 382/117 |
| 2014/0375541 A1* | 12/2014 | Nister | ..................... | G06F 3/013 345/156 |
| 2014/0375789 A1* | 12/2014 | Lou | .................... | G02B 27/0172 348/78 |
| 2015/0022435 A1* | 1/2015 | Luebke | ................... | G06F 3/013 345/156 |

OTHER PUBLICATIONS

Holliman et al., Three-Dimensional Displays: A Review and Applications Analysis, 2011, IEEE, pp. 362-371.*
Canessa et al., The Perspective Geometry of the Eye: Toward Image-Based Eye-Tracking, 2012, Human-Centric Machine Vision, pp. 1-30.*
Khan et al., Automatic localization of pupil using eccentricity and iris using gradient based method, 2010, Optics and Lasers in Engineering, pp. 177-187.*
Tomeo-Reyes et al., Quality Metrics Influence on Iris Recognition Systems Performance, 2011, Security Technology (ICCST), pp. 1-7.*

* cited by examiner

MULTIPLE VIEWPOINT IMAGE CAPTURE OF A DISPLAY USER

FIELD

Embodiments of the present invention generally pertain to computing devices and more specifically to computer display devices.

BACKGROUND

"Eye-tracking" or "gaze-tracking" processes are used for identifying an object a user is looking at or determining where a user is looking. Current solutions use light reflected by the cornea of the user's eye (or further in the eye), such as infrared light, to track the direction of the user's eyes. These processes, however, are extremely power intensive and are therefore of limited use on devices operating on a restricted power supply, such as mobile computing devices.

Furthermore, eye/gaze tracking processes utilize captured image data. Mobile computing devices typically include image sensors having a viewpoint (i.e., the distance and angle from which the image sensor captures image data) separate from the display of the mobile computing device. For eye/gaze tracking processes to determine what a user is looking at on the display, they would use images captured via sensors disposed away from the display surface and thus away from the target of the user's gaze/focus, thereby limiting their accuracy.

BRIEF DESCRIPTION OF THE DRAWINGS

The following description includes discussion of figures having illustrations given by way of example of implementations of embodiments of the invention. The drawings should be understood by way of example, and not by way of limitation. As used herein, references to one or more "embodiments" are to be understood as describing a particular feature, structure, or characteristic included in at least one implementation of the invention. Thus, phrases such as "in one embodiment" or "in an alternate embodiment" appearing herein describe various embodiments and implementations of the invention, and do not necessarily all refer to the same embodiment. However, they are also not necessarily mutually exclusive.

Descriptions of certain details and implementations follow, including a description of the figures, which may depict some or all of the embodiments described below, as well as a discussion of other potential embodiments or implementations of the inventive concepts presented herein. An overview of embodiments of the invention is provided below, followed by a more detailed description with reference to the drawings.

DETAILED DESCRIPTION

Embodiments of the invention describe processes for capturing, selecting and analyzing multiple viewpoint image data of a user of a computing device display. Throughout this specification, several terms of art are used. These terms are to take on their ordinary meaning in the art from which they come, unless specifically defined herein or the context of their use would clearly suggest otherwise. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Figure 1A:
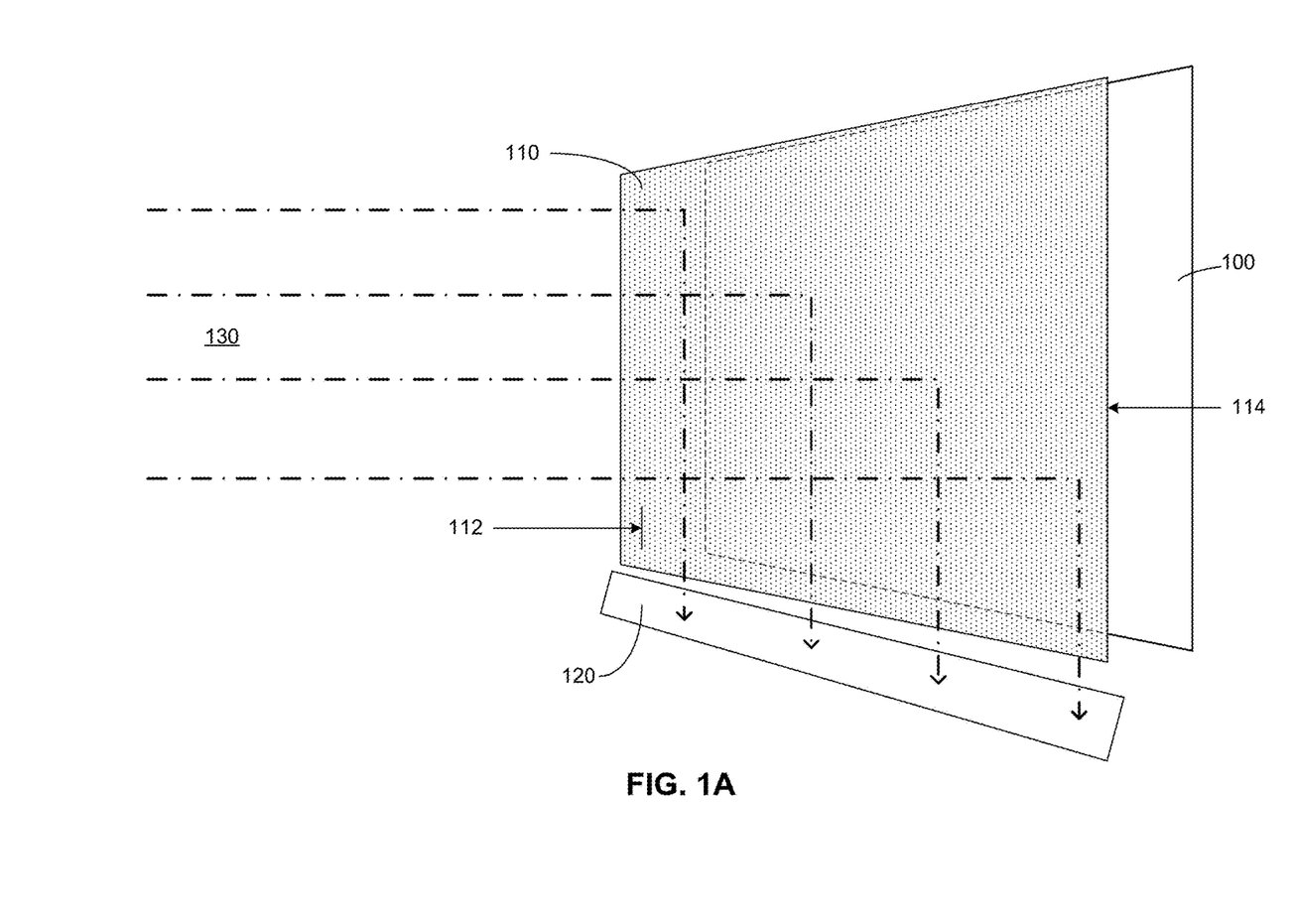
FIG. 1A is an illustration of user eye/gaze tracking components according to an embodiment of the invention.

FIG. 1A is an illustration of user eye/gaze tracking components according to an embodiment of the invention. In this embodiment, computing device display 100, deflector overlay 110 and image capture component 120 are illustrated. Said components may be standalone communicatively coupled devices, multiple components included in the same device (e.g., within a bezel surrounding a mobile computing device display), or integrated into a single component.

In this embodiment, deflector 110 is shown to include front-side surface 112 to deflect light 130, shown as being directed towards display 100, away from the display and towards image capture component 120. Opposing back-side surface 114, however, is a transmissive side that allows a user to view light emitted from the display (i.e., configured such that defector 110 does not prevent the visibility of the display). Deflector 110 may comprise any beam splitter, for example, a Fresnel Prism, capable of the operations described above. Said Fresnel Prism may comprise a linear Fresnel prism array with grooves or angled facets to direct light 130 towards image capture component 120 (i.e., oriented perpendicular to the display).

Image capture component 120 includes a plurality of image sensors and lenses to capture image data. For example, image capture component 120 may comprise a plurality of complementary metal-oxide semiconductor (CMOS) image sensors and a plurality of micro-lenses disposed over said CMOS image sensors. In some embodiments, a Fresnel lens assembly is used. A Fresnel lens may reduce the amount of material required compared to a plurality of individual lenses. A Fresnel lens is divided into a set of concentric annular sections for receiving light; in each section, the overall thickness is varies. The number of these Fresnel lens sections may correspond to the number of image sensors included in image capture component 120. The number of image sensors may be as little as two, or as high as equal to the number of pixels of display 100; in embodiments that utilize a large number of image sensors, a Fresnel lens may significantly reduce the amount of material required to focus light on each image sensor compared to an array of individual microlenses.

Deflector 110 and the plurality of image sensors of image capture component 120 therefore allows image data to be captured from multiple viewpoints ((i.e., the distance and angle from which each image sensor captures image data). As described below, embodiments of the invention such as the embodiment illustrated in FIG. 1 are used to track a user's gaze with respect to the display and determine a target area of the user's gaze on the display. Embodiments of the invention may be used to improve current gaze tracking solutions, which fail to capture images directly of the user's gaze and require some deduction or estimation, which affects accuracy and precision. Embodiments of the invention simplify eye gaze location and tracking processes; existing eye gaze trackers are open loop based processes with the position and direction of a user's eye gaze being indirectly deduced. Embodiments of the invention execute a closed loop process based on the captured image data which can accurately locate and map the user eye gaze to a screen location. Furthermore, because embodiments of the invention use passive components such as deflector 110, they are more power efficient compared to prior art solutions.

Figure 1B:
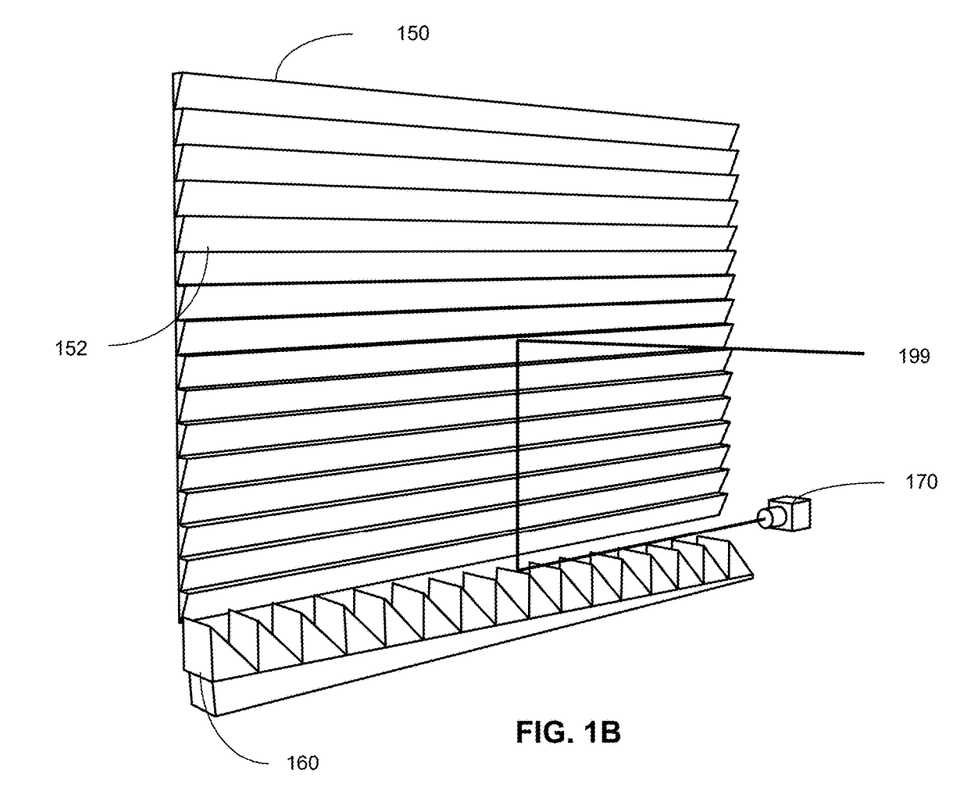
FIG. 1B is an illustration of a deflector overlay and image capturing component according to an embodiment of the invention.

FIG. 1B is an illustration of a deflector overlay and image capturing component according to an embodiment of the invention. In this embodiment, deflector 150 is shown to include front-side surface 152 to deflect light 199 at a substantially normal angle (e.g., 90°), towards deflector array 160 which deflects light 199 again at a substantially normal angle (90°) towards image capture device 170. Thus, when disposed in front of a display surface, deflector 150 allows light from the display behind it to pass through while light from the subject in front of the display (i.e., from the user) is reflected to an image capture device through prism action. These deflectors may be made for any screen size and any type of screen (e.g., light guiding panel, touchscreen displays, projection screens, etc.).

In this embodiment, deflector 150 comprises a prism divided into finite elements and overlaid on a transparent sheet (e.g., a transparent thermoplastic such as poly(methyl methacrylate) (PMMA)) to function similar to a Fresnel lens. This deflector may be overlaid onto a display to direct light to deflector array 160, which may be disposed below a bezel of a display device, or formed thin enough to be included in said bezel. Embodiments of the invention may thus utilize the same materials and manufacturing processes as other light guiding panel devices, such as Liquid Crystal Display (LCD) devices.

Figure 2A:
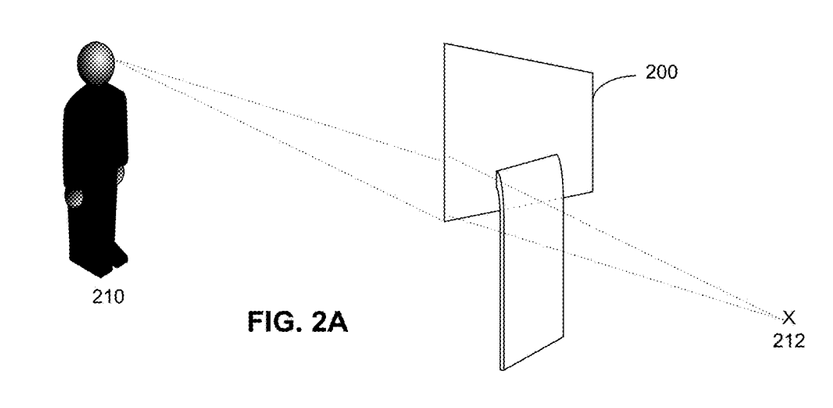
FIG. 2A and FIG. 2B are illustrations of an example use of a user eye/gaze tracking device according to an embodiment of the invention.
Figure 2B:
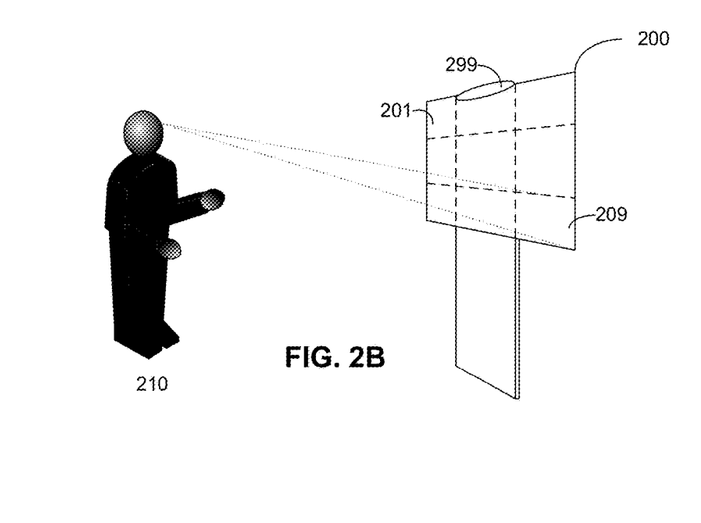

FIG. 2A and FIG. 2B are illustrations of an example use of a user eye/gaze tracking device according to an embodiment of the invention. In this embodiment, display system 200 includes components to capture image data of user 210 from multiple viewpoints. FIG. 2A and FIG. 2B illustrate a drawback of prior solutions. In this example, user 210 is positioned to where his face is entirely in front of display 200; for an image sensor to capture the user's gaze with respect to the display, its viewpoint would have to be on or behind display 210 (i.e., along illustrated positional vector 212). Such positioning is not possible, as the line of sign for positional vector 212 is blocked by display 200, and an image sensors placed on the display would affect the visibility of the display.

Embodiments of the invention address this issue by deflecting light towards an edge of display 200 (as described above with reference to FIG. 1) so that image data of the user's gaze may be captured consistent with his position in front of the display.

FIG. 2B illustrates that display 200 may be divided into display sections 201-209. Light towards each display section is directed towards a different image sensor. Thus, in this embodiment, the image capture component includes nine image sensors to capture image data of user 210 at nine different viewpoints—i.e., viewpoints corresponding to display sections 201-209 (alternatively referred to herein as "perspective zones." Other embodiments may have different levels of granularity—as low as two display sections/image sensors or as high as an image sensor corresponding to every pixel of the display.

In this example, user 210 is gazing/staring at display section 209, and image data captured by the corresponding image sensor for this perspective zone may be utilized by an application. For example, image data capturing the user's gaze towards display section 209 may be used in a videoconference application, where said image data is rendered to be seen by the end users. This image data from display section 209 would have a viewpoint so that it would appear to end users as if the user is looking directly at them; prior art solutions, by comparison, are unable to provide image data from this perspective. For example, prior art solutions would position a camera at the top of display 200 (shown in FIG. 2B as position 299), and video data of user 210 would appear to end users as if the user were looking down and away from the camera.

Other applications may utilize the image data captured from display section 209 differently. For example, display section 209 may include an icon, and the gaze/stare of user 210 may be processed as a user input/output command for that icon. In another example, image rendering could be limited to an area where the user is staring; thus in this example, display section 209 may be fully rendered while the remaining display sections may be partially rendered (i.e., rendered at a lower resolution, or not displayed at all). The accuracy of such applications would be limited if the utilized image data were captured from viewpoint 299, rather than the viewpoint corresponding to display section 209.

Figure 3:
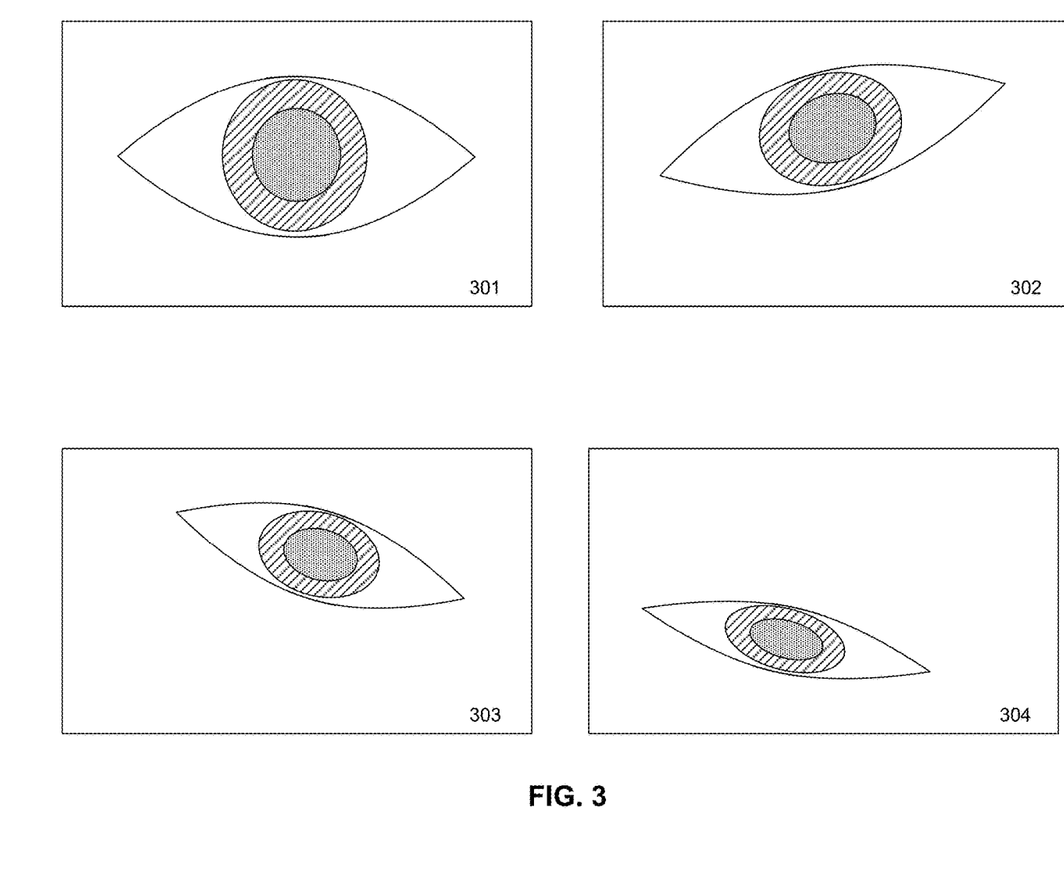
FIG. 3 is an exemplary illustration of image data for user eye/gaze tracking processes according to an embodiment of the invention.

FIG. 3 is an exemplary illustration of image data for user eye/gaze tracking processes according to an embodiment of the invention. In this example, images 301-304 are shown of a user's eye from various viewpoints. In some embodiments, a user's gaze direction is determined based, in part, on iris eccentricity (i.e., the position of the user's irises within the sclera). The plurality of captured images allows the eccentricity of the iris to be analyzed from multiple viewpoints. For example, each iris image may be compared with a curve that accurately represents the curvature of the iris. The point of least measure of eccentricity defines the point where the user's eye gaze is directed. An iris viewed from a near-orthogonal angle (i.e., the target of a user's stare/gaze) may appear round, while an iris viewed from an askew angle may appear circular oblique; by analyzing the "roundness" of each curve, the image having the least distorted iris may be determined. The viewpoint of the image having the least distorted iris may be identified as being directly in front of the point of gaze (or the viewpoint closest to the target of the user's gaze).

Thus, in this example, image 301 is determined to include image data of a user's targeted gaze, while images 302-304 are determined by be captured from an askew angle, based on the aspect of the user's iris captured in their respective images. The process of determining the user's targeted gaze may be a continuous, closed loop process, enabling real-time dynamic user gaze tracking (compared to prior art open-loop solutions).

In other embodiments, the determination of a user's gaze direction may include other factors besides iris eccentricity. For example, embodiments of the invention may also analyze the orientation of other aspects of the user, such as face eccentricity, and the position of the inner features of the face (e.g., eyes, nose, mouth, etc.).

Figure 4:
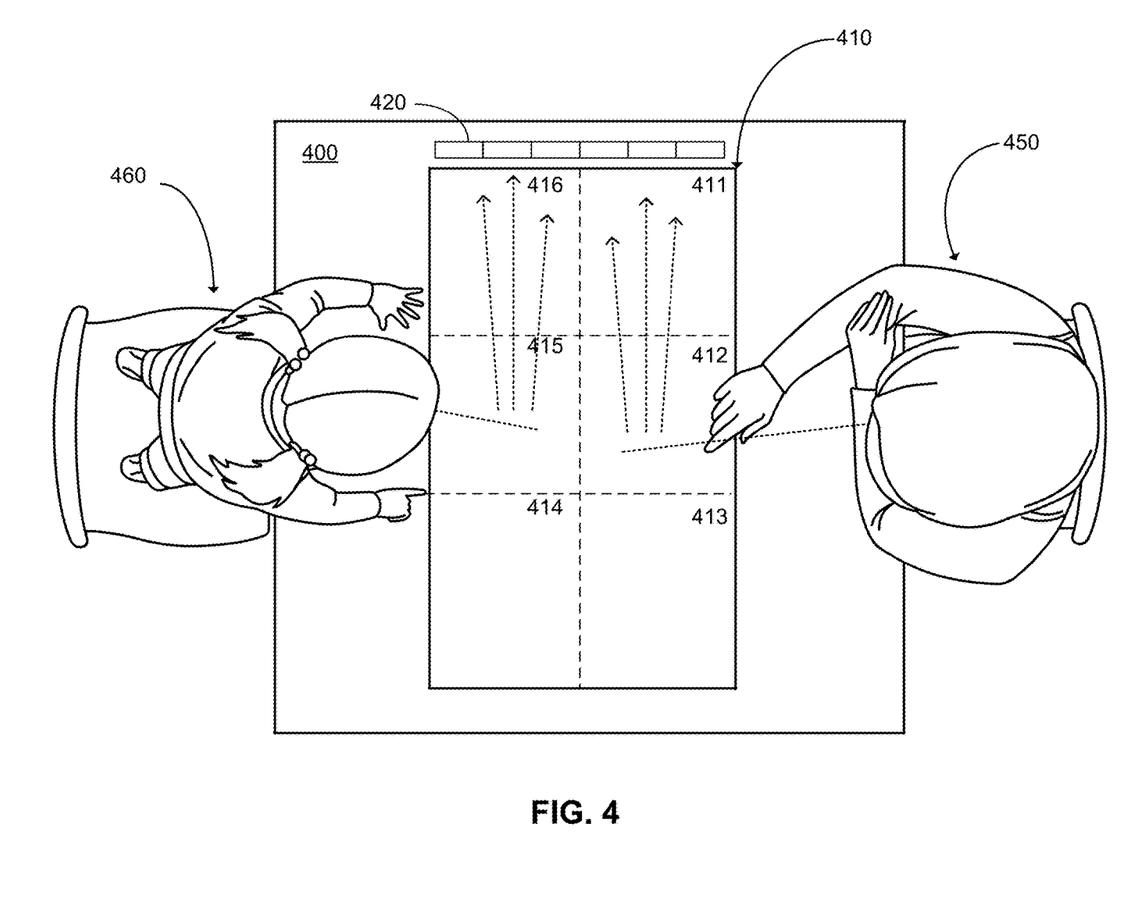
FIG. 4 is an illustration of a system for multiple-user eye/gaze tracking according to an embodiment of the invention.

FIG. 4 is an illustration of a system for multiple-user eye/gaze tracking according to an embodiment of the invention. In this embodiment, system 400 comprises a tabletop display system and is configured to support interactions with users 450 and 460. Display 410 of system 400 is shown to include a deflector to deflect light towards sensors 420 (disposed to the side of the display) to capture image data of users 450 and 460, such as image data of each user's eye, from a plurality of viewpoints to determine the respective user's eye/gaze direction.

Display 410 is shown to comprise sections 411-416. In this embodiment, a deflector overlay is disposed over the display such that light directed towards sections 411-413 is shown to be allocated for capturing image data of user 450 from viewpoints associated with those sections, while light directed towards sections 414-416 is shown to be allocated for capturing image data of user 460 from viewpoints associated with those sections. As described above, image data of said user may be used to execute operations such as providing image/video data from the perspective of a near-orthogonal angle of the user's gaze, detecting gaze related gestures, selectively rendering display data, etc.

In other embodiments, image data may further be used to identify a selected user (e.g., user 450) from other users positioned near display 410. For example, gazes/stares of only one of the users (e.g., user 450) may be detected and analyzed, while gestures from the other users are ignored.

Figure 5:
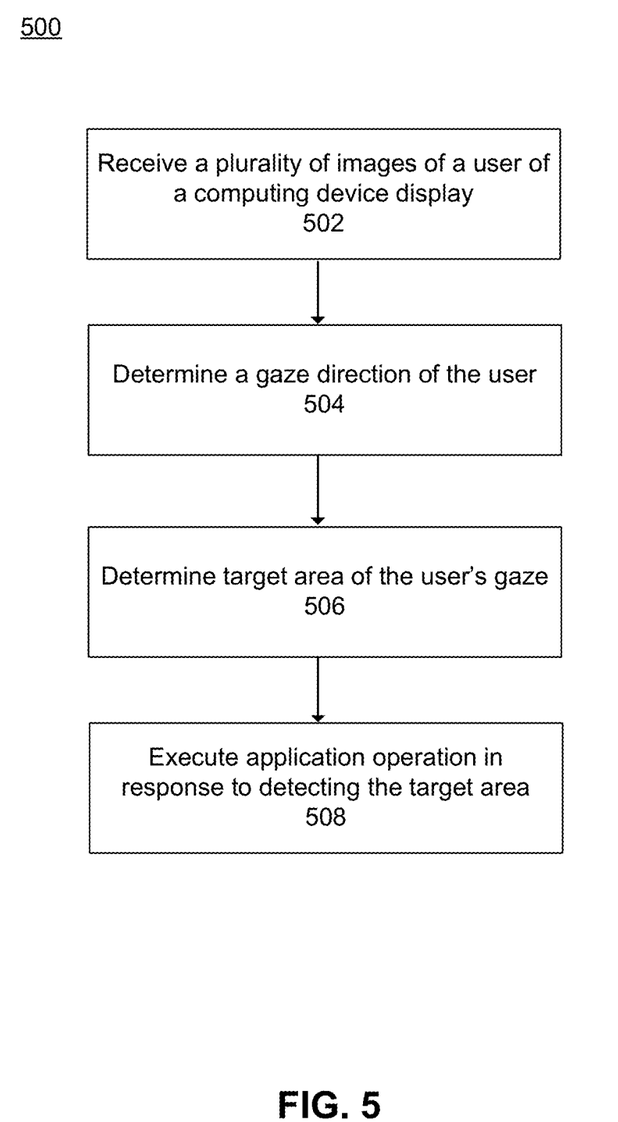
FIG. 5 is a flow diagram illustrating a process for user eye/gaze tracking according to an embodiment of the invention.

FIG. 5 is a flow diagram illustrating a process for user eye/gaze tracking according to an embodiment of the invention. Flow diagrams as illustrated herein provide examples of sequences of various process actions. Although shown in a particular sequence or order, unless otherwise specified, the order of the actions can be modified. Thus, the illustrated implementations should be understood only as examples, and the illustrated processes can be performed in a different order, and some actions may be performed in parallel. Additionally, one or more actions can be omitted in various embodiments of the invention; thus, not all actions are required in every implementation. Other process flows are possible.

Process 500 includes operations for receiving a plurality of images from an image capture system, wherein the plurality of images comprises images of a user of a computing system from multiple viewpoints, 502. As described above, said image capture system includes a display of a computing device, a plurality of image sensors disposed next to the display to capture image data of a user of the display of the computing device from multiple viewpoints, and a deflector having a front-side to deflect light away from the display towards the plurality of image sensors.

A gaze direction of the user with respect to the display is determined based, at least in part, on the plurality of images, 504. Said gaze direction may be determined, for example, by a user's iris eccentricity or other eye/facial features as captured from the multiple viewpoints of the received image data. A target area on the display is determined based, at least in part, on the determined gaze direction of the user, 506. In some embodiments, if the user's gaze is directed away from the display, a closest target area on the display is selected; in other embodiments, a user's gaze is directed away from the display is ignored. An application operation in response to determining the target area of the user's gaze is executed, 508.

Figure 6:
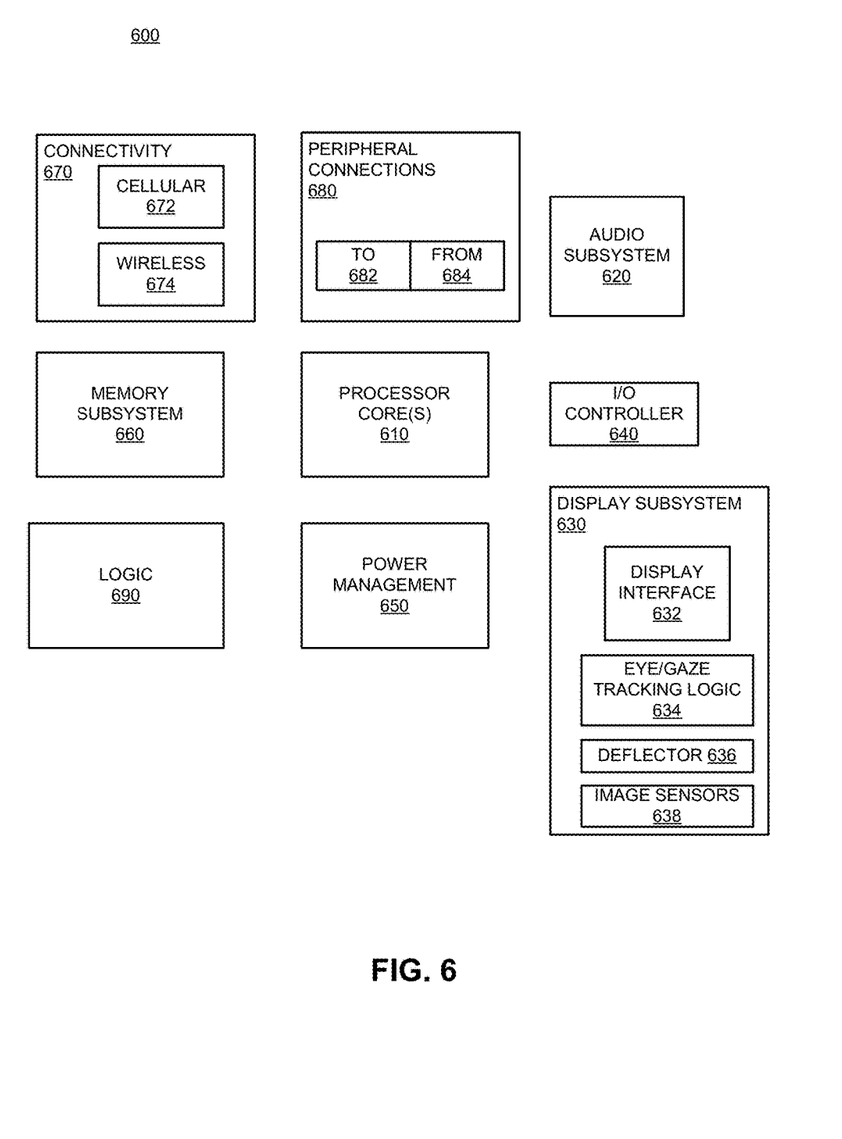
FIG. 6 is a block diagram of computing components to support user eye/gaze tracking processes according to an embodiment of the invention.

FIG. 6 is a block diagram of computing components to support user eye/gaze tracking processes according to an embodiment of the invention. It will be understood that certain of the components are shown generally, and not all components of such a device are shown in device 600. Furthermore, it will be understood that any of the illustrated components may be discrete components or may be components included on a system on a chip (SoC) integrated circuit (IC), and may be communicatively coupled through any direct or indirect means.

Any combination of the components of computing device 600 may be included in an integrated computing device and display as discussed above, or may be included in a computing device communicatively coupled to a display to execute "backend processing;" thus, computing device 600 may represent a mobile computing device, such as a computing tablet, a mobile phone or smartphone, a wireless-enabled e-reader, or other wireless mobile device.

Device 600 includes one or more processor cores 610, which performs the primary processing operations of device 600. Each of processor core(s) 610 can be SoC components, or can be included in one or more physical devices, such as single or multi-core microprocessors, application processors, microcontrollers, programmable logic devices, or other processing means. The processing operations performed by processor core(s) 610 include the execution of an operating platform or operating system on which applications and/or device functions are executed. The processing operations include operations related to I/O (input/output) with a human user or with other devices, operations related to power management, and/or operations related to connecting device 600 to another device. The processing operations may also include operations related to audio I/O and/or display I/O.

In one embodiment, device 600 includes audio subsystem 620, which represents hardware (e.g., audio hardware and audio circuits) and software (e.g., drivers, codecs) components associated with providing audio functions to the computing device. Audio functions can include speaker and/or headphone output, as well as microphone input via any of the audio jacks described above. Devices for such functions can be integrated into device 600, or connected to device 600. In one embodiment, a user interacts with device 600 by providing audio commands that are received and processed by processor core(s) 610.

Display subsystem 630 represents hardware (e.g., display devices) and software (e.g., drivers) components that provide a visual and/or tactile display for a user to interact with the computing device. Display subsystem 630 includes display interface 632, which includes the particular screen or hardware device used to provide a display to a user. In one embodiment, display interface 632 includes logic separate from processor core(s) 610 to perform at least some processing related to the display. In one embodiment, display subsystem 630 includes a touchscreen device that provides both output and input to a user. In this embodiment, display subsystem 630 is shown to be communicatively coupled to user eye/gaze tracking logic 634, which utilizes deflecting means 636 and image sensors 638 to capture user image data as described above.

I/O controller 640 represents hardware devices and software components related to interaction with a user. I/O controller 640 can operate to manage hardware that is part of audio subsystem 620 and/or display subsystem 630. Additionally, I/O controller 640 illustrates a connection point for additional devices that connect to device 600 through which a user might interact with the system. For example, devices that can be attached to device 600 might include microphone devices, speaker or stereo systems, video systems or other display device, keyboard or keypad devices, or other I/O devices for use with specific applications such as card readers or other devices.

As mentioned above, I/O controller 640 can interact with audio subsystem 620 and/or display subsystem 630. For example, input through a microphone or other audio device can provide input or commands for one or more applications or functions of device 600. Additionally, audio output can be provided instead of or in addition to display output. In another example, if display subsystem includes a touchscreen, the display device also acts as an input device, which can be at least partially managed by I/O controller 640. There can also be additional buttons or switches on device 600 to provide I/O functions managed by I/O controller 640.

In one embodiment, I/O controller 640 manages devices such as accelerometers, cameras, light sensors or other environmental sensors, or other hardware that can be included in device 600. The input can be part of direct user interaction, as well as providing environmental input to the system to influence its operations (such as filtering for noise, adjusting displays for brightness detection, applying a flash for a camera, or other features). In one embodiment, device 600 includes power management 650 that manages battery power usage, charging of the battery, and features related to power saving operation.

Memory subsystem 660 includes memory devices for storing information in device 600. Memory can include nonvolatile (state does not change if power to the memory device is interrupted) and/or volatile (state is indeterminate if power to the memory device is interrupted) memory devices. Memory 660 can store application data, user data, music, photos, documents, or other data, as well as system data (whether long-term or temporary) related to the execution of the applications and functions of system 600. Memory 660 further stores firmware images related to boot path operations, and thus may include DRAM devices to store said firmware images as described above.

Connectivity 670 includes hardware devices (e.g., wireless and/or wired connectors and communication hardware) and software components (e.g., drivers, protocol stacks) to enable device 600 to communicate with external devices. The device could be separate devices, such as other computing devices, wireless access points or base stations, as well as peripherals such as headsets, printers, or other devices.

Connectivity 670 can include multiple different types of connectivity. To generalize, device 600 is illustrated with cellular connectivity 672 and wireless connectivity 674. Cellular connectivity 672 refers generally to cellular network connectivity provided by wireless carriers, such as provided via GSM (global system for mobile communications) or variations or derivatives, CDMA (code division multiple access) or variations or derivatives, TDM (time division multiplexing) or variations or derivatives, or other cellular service standards. Wireless connectivity 674 refers to wireless connectivity that is not cellular, and can include personal area networks (such as Bluetooth), local area networks (such as Wi-Fi), and/or wide area networks (such as Wi-Max), or other wireless communication.

Peripheral connections 680 include hardware interfaces and connectors for implementing non-flash firmware storage support as described above, as well as software components (e.g., drivers, protocol stacks) to make peripheral connections. It will be understood that device 600 could both be a peripheral device ("to" 682) to other computing devices, as well as have peripheral devices ("from" 684) connected to it. Device 600 commonly has a "docking" connector to connect to other computing devices for purposes such as managing (e.g., downloading and/or uploading, changing, synchronizing) content on device 600. Additionally, a docking connector can allow device 600 to connect to certain peripherals that allow device 600 to control content output, for example, to audiovisual or other systems.

Logic 690 may comprise software logic, firmware logic, hardware logic, or a combination of two or more types of logic. In this embodiment, said logic may be used to support operations for eye/gaze tracking logic 634.

In addition to a proprietary docking connector or other proprietary connection hardware, device 600 can make peripheral connections 680 via common or standards-based connectors. Common types can include a Universal Serial Bus (USB) connector (which can include any of a number of different hardware interfaces), DisplayPort including MiniDisplayPort (MDP), High Definition Multimedia Interface (HDMI), Firewire, or other type.

Embodiments of the invention describe a system including a display of a computing device, a plurality of image sensors disposed next to the display of the computing device to capture image data of a user of the display, and a deflector. Said deflector includes a first side to deflect light away from the display towards the plurality of image sensors, and a second transmissive side, opposite the first side, to allow light from the display to pass through to the user. The system further includes logic to determine a gaze direction of the user with respect to the display based, at least in part, on the plurality of images, determine a target area of the user's gaze on the display based, at least in part, on the determined gaze direction of the user, and execute an application operation in response to determining the target area of the user's gaze.

In some embodiments, determining the target area of the user's gaze on the display includes identifying an eye of the user from each of the plurality of images, and determining the gaze direction of the user based, at least in part, on iris eccentricity of the identified eye of the user in each of the plurality of the images.

In some embodiments, the plurality of image sensors are disposed below the display of the computing device. In some embodiments, the plurality of image sensors and the deflector are included in a bezel surrounding the display of the computing device. In some embodiments, the display of the computing device comprises a tabletop display surface.

The above described deflector have a side comprising a Fresnel prism. In some embodiments, systems further include a Fresnel lens disposed over the plurality of image sensors.

In some embodiments, the image data captured by the plurality of imaging sensors comprises real-time video data, the application comprises a streaming video application, and the application operation comprises selecting the real-time video data corresponding to the target area of the user's gaze as an output of the streaming video application. In some embodiments, the application operation executed in response to determining the target area of the user's gaze comprises a user input/output (I/O) operation. For example, the application may display a plurality of click-thru icons, and the user I/O operation comprises selecting one of the click-thru icons.

In some embodiments, the plurality of image sensors and the plurality of viewpoints are equal to a number of pixels of the display of the computing device. In some embodiments, the deflector comprises a plurality of regions, the user of the computing device comprises a plurality of users, and the logic further assigns one or more of the regions of the deflector to each of the plurality of users.

Embodiments of the invention describe an article of manufacture comprising a computer-readable non-transitory storage medium having instructions stored thereon to cause a processor to perform operations; these operations may include receiving data comprising a plurality of images from an image capture system, wherein the plurality of images comprises images of a user of a computing system captured from a plurality of viewpoints, determining a gaze direction of the user with respect to the display based, at least in part, on the plurality of images, determining a target area on the display based, at least in part, on the determined gaze direction of the user, and executing an application operation in response to determining the target area of the user's gaze.

In some embodiments operations of an article of manufacture for determining the target area of the user's gaze on the display further include identifying an eye of the user from each of the plurality of images, and determining the gaze direction of the user based, at least in part, on iris eccentricity of the identified eye of the user in each of the plurality of images.

In some embodiments, the image data captured by the plurality of imaging sensors comprises real-time video data, the application comprises a streaming video application, and the application operation comprises selecting the real-time video data corresponding to the target area of the user's gaze as an output of the streaming video application. In some embodiments, the application operation executed in response to determining the target area of the user's gaze comprises a user input/output (I/O) operation.

The above described deflector may comprise a plurality of regions and the user of the computing device may comprise a plurality of users. The operations of the article of manufacture may further include assigning one or more of the regions of the deflector to each of the plurality of users.

Embodiments of the invention describe an apparatus including a plurality of image sensors to capture image data of a user of the display of the computing device from a plurality of viewpoints included on the display of the computing device, and a deflector; said deflector may include a first side to deflect light away from each of the viewpoints included on the display towards the plurality of image sensors, and a second transmissive side, opposite the first side, to allow light from the display to pass through to the user. In some embodiments, the first side of the deflector comprises a Fresnel prism, and the apparatus may include a Fresnel lens disposed over the plurality of image sensors. In some embodiments, the plurality of image sensors and the plurality of viewpoints are equal to a number of pixels of the display of the computing device.

In some embodiments, apparatuses further include logic to determine a gaze direction of the user with respect to the display based, at least in part, on the plurality of images, determine a target area of the user's gaze on the display based, at least in part, on the determined gaze direction of the user, and execute an application operation in response to determining the target area of the user's gaze. In some of these embodiments, The logic determines the target area of the user's gaze on the display by identifying an eye of the user from each of the plurality of images, and determining the gaze direction of the user based, at least in part, on iris eccentricity of the identified eye of the user in each of the plurality of the images.

Various components referred to above as processes, servers, or tools described herein may be a means for performing the functions described. Each component described herein includes software or hardware, or a combination of these. Each and all components may be implemented as logic such as software modules, firmware modules, hardware modules and/or components, special-purpose hardware (e.g., application specific hardware, ASICs, DSPs, etc.), embedded controllers, hardwired circuitry, hardware logic, etc. Software content (e.g., data, instructions, configuration) may be provided via an article of manufacture including a non-transitory, tangible computer or machine readable storage medium, which provides content that represents instructions that can be executed. The content may result in a computer performing various functions/operations described herein.

A computer readable non-transitory storage medium includes any mechanism that provides (i.e., stores and/or transmits) information in a form accessible by a computer (e.g., computing device, electronic system, etc.), such as recordable/non-recordable media (e.g., read only memory (ROM), random access memory (RAM), magnetic disk storage media, optical storage media, flash memory devices, etc.). The content may be directly executable ("object" or "executable" form), source code, or difference code ("delta" or "patch" code). A computer readable non-transitory storage medium may also include a storage or database from which content can be downloaded. Said computer readable medium may also include a device or product having content stored thereon at a time of sale or delivery. Thus, delivering a device with stored content, or offering content for download over a communication medium may be understood as providing an article of manufacture with such content described herein.

The invention claimed is:

1. An apparatus comprising:
a plurality of separate image sensors to capture a plurality of images of a user of a display of a computing device from an array of viewpoints included on the display of the computing device, each of the plurality of separate image sensors to capture images of the user from a different viewpoint of the array of viewpoints on the display;
a deflector comprising:
a first side to deflect light away from each of the array of viewpoints included on the display towards a respective image sensor of the plurality of image sensors, and
a second transmissive side, opposite the first side, to allow light from the display to pass through to the user; and
logic to:
identify an eye of the user in each of the plurality of images captured from the viewpoint associated with each of the plurality of image sensors,
determine a gaze direction of the user with respect to the display based, at least in part, on comparison of the identified eye of the user captured in each of the plurality of images, wherein determining the gaze direction of the user includes comparing iris eccentricity of the identified eye of the user captured in each of the plurality of the images of the user to analyze roundness of the iris in each of the plurality of images of the user to determine an image in the plurality of images with less distortion than any other images in the plurality of images as being a viewpoint closest to the gaze direction of the user;
determine a target area of the user's gaze on the display based, at least in part, on the determined gaze direction of the user, and
execute an application operation in response to determining the target area of the user's gaze.

2. The apparatus of claim 1, wherein the first side of the deflector comprises a Fresnel prism.

3. The apparatus of claim 2, further comprising:
a Fresnel lens disposed over the plurality of image sensors.

4. A system comprising:
a display of a computing device;
a plurality of separate image sensors disposed next to the display of the computing device to capture a plurality of images of a user of the display, each of the plurality of image sensors to capture images of the user from a different viewpoint of an array of viewpoints on the display;
a deflector comprising:
a first side to deflect light away from each of the array of viewpoints included on the display towards a respective image sensor of the plurality of image sensors, and
a second transmissive side, opposite the first side, to allow light from the display to pass through to the user; and
logic to:
identify an eye of the user in each of the plurality of images captured from the viewpoint associated with each of the plurality of image sensors;
determine a gaze direction of the user with respect to the display based, at least in part, on comparison of the identified eye of the user captured in each of the plurality of images, wherein determining the gaze direction of the user includes comparing iris eccentricity of the identified eye of the user captured in each of the plurality of the images of the user to analyze roundness of the iris in each of the plurality of images of the user to determine an image in the plurality of images with less distortion than any other images in the plurality of images as being a viewpoint closest to the gaze direction of the user,
determine a target area of the user's gaze on the display based, at least in part, on the determined gaze direction of the user, and
execute an application operation in response to determining the target area of the user's gaze.

5. The system of claim 4, wherein the plurality of image sensors are disposed below the display of the computing device.

6. The system of claim 4, wherein the plurality of image sensors and the deflector are included in a bezel surrounding the display of the computing device.

7. The system of claim 4, wherein the display of the computing device comprises a tabletop display surface.

8. The system of claim 4, wherein the first side of the deflector comprises a Fresnel prism.

9. The system of claim 8, further comprising:
a Fresnel lens disposed over the plurality of image sensors.

10. The system of claim 4, wherein the plurality of images captured by the plurality of imaging sensors comprises real-time video data, the application comprises a streaming video application, and the application operation comprises selecting the real-time video data corresponding to the target area of the user's gaze as an output of the streaming video application.

11. The system of claim 4, wherein the application operation executed in response to determining the target area of the user's gaze comprises a user input/output (I/O) operation.

12. The system of claim 11, wherein the application is to display a plurality of click-thru icons, and the user I/O operation comprises selecting one of the click-thru icons.

13. The system of claim 4, wherein the deflector comprises a plurality of regions, the user of the computing device comprises a plurality of users, and the logic to further:
assign one or more of the regions of the deflector to each of the plurality of users.

14. The system of claim 4, further comprising:
an antenna; and
radio frequency circuitry coupled to the antenna to receive signal data to be processed by the system.

15. An article of manufacture comprising a computer-readable non-transitory storage medium having instructions stored thereon to cause a processor to perform operations including:
receiving data comprising a plurality of images from an image capture system, wherein the plurality of images comprises images of a user of a computing system captured by a plurality of image sensors from an array of viewpoints on the display, each of the plurality of image sensors to capture images of the user from a different viewpoint of the array of viewpoints on the display, light being deflected away from each of the array of viewpoints towards a respective image sensor of the plurality of image sensors;
identifying an eye of the user in each of the plurality of images captured from the viewpoint associated with each of the plurality of image sensors;
determining a gaze direction of the user with respect to the display based, at least in part, on comparison of the identified eye of the user captured in each of the plurality of images captured, wherein determining the gaze direction of the user includes comparing iris eccentricity of the identified eye of the user captured in each of the plurality of the images of the user to analyze roundness of the iris in each of the plurality of images of the user to determine an image in the plurality of images with less distortion than any other images in the plurality of images as being a viewpoint closest to the gaze direction of the user;
determining a target area on the display based, at least in part, on the determined gaze direction of the user; and
executing an application operation in response to determining the target area of the user's gaze.

16. The article of manufacture of claim 15, wherein the plurality of images captured by the plurality of imaging sensors comprises real-time video data, the application comprises a streaming video application, and the application operation comprises selecting the real-time video data corresponding to the target area of the user's gaze as an output of the streaming video application.

17. The article of manufacture of claim 15, wherein the application operation executed in response to determining the target area of the user's gaze comprises a user input/output (I/O) operation.

18. The article of manufacture of claim 15, wherein the deflector comprises a plurality of regions, the user of the computing device comprises a plurality of users, and the operations further include:
assigning one or more of the regions of the deflector to each of the plurality of users.

19. The apparatus of claim 1, wherein each image sensor of the plurality of image sensors includes a separate complementary metal-oxide semiconductor (CMOS) image sensor.

20. The system of claim 4, wherein each image sensor of the plurality of image sensors includes a separate complementary metal-oxide semiconductor (CMOS) image sensor.

\* \* \* \* \*